United States Patent
Iwamoto

(10) Patent No.: US 12,447,975 B2
(45) Date of Patent: Oct. 21, 2025

(54) CONTROL DEVICE, VEHICLE, CONTROL METHOD AND COMPUTER-READABLE STORAGE MEDIUM

(71) Applicants: TOYOTA JIDOSHA KABUSHIKI KAISHA, Toyota (JP); DENSO CORPORATION, Kariya (JP)

(72) Inventor: Jun Iwamoto, Nisshin (JP)

(73) Assignees: TOYOTA JIDOSHA KABUSHIKI KAISHA, Toyota (JP); DENSO CORPORATION, Kariya (JP)

( * ) Notice: Subject to any disclaimer, the term of this patent is extended or adjusted under 35 U.S.C. 154(b) by 408 days.

(21) Appl. No.: 18/147,056

(22) Filed: Dec. 28, 2022

(65) Prior Publication Data
US 2023/0227049 A1 Jul. 20, 2023

(30) Foreign Application Priority Data
Jan. 18, 2022 (JP) .................................. 2022-005930

(51) Int. Cl.
*B60W 50/00* (2006.01)

(52) U.S. Cl.
CPC ..... *B60W 50/00* (2013.01); *B60W 2050/0083* (2013.01); *B60W 2554/00* (2020.02)

(58) Field of Classification Search
CPC ............. B60W 50/00; B60W 2554/00; B60W 2050/0083
See application file for complete search history.

(56) References Cited

U.S. PATENT DOCUMENTS

| 5,163,148 A | * | 11/1992 | Walls | G06F 11/1466 714/13 |
| 5,226,157 A | * | 7/1993 | Nakano | G06F 11/1466 714/E11.123 |
| 5,317,728 A | * | 5/1994 | Tevis | G06F 16/10 |
| 5,812,394 A | * | 9/1998 | Lewis | G05B 19/0426 700/86 |
| 7,085,904 B2 | * | 8/2006 | Mizuno | G06F 11/1458 714/E11.123 |

FOREIGN PATENT DOCUMENTS

| JP | 2008077220 A | 4/2008 |
| JP | 2016134057 A | 7/2016 |

* cited by examiner

*Primary Examiner* — Gertrude Arthur Jeanglaude
(74) *Attorney, Agent, or Firm* — Dickinson Wright, PLLC

(57) ABSTRACT

The control device, which operates due to a processor executing an object-oriented program, backs-up, to a storing section, respective first combinations of elements of a first object in which class structure relating to an application program is defined, and respective second combinations of elements of a second object in which class structure relating to a storage region used by an application program is defined. In a case in which generation of an object is necessary when the program is started, for the first object, the control device reads-out the respective first combinations from the storing section and generates the first object, and, for the second object, the control device reads-out the respective second combinations from the storing section and generates the second object.

8 Claims, 7 Drawing Sheets

| user_id | ELEMENT |
|---|---|
| xx | user_name |
| xx | shared_directory_id |
| xx | private_directory_id |
| ... | ... |

200B

| directory_id | ELEMENT |
|---|---|
| zz | directory_total_size |
| zz | directory_used_size |
| ... | ... |

# CONTROL DEVICE, VEHICLE, CONTROL METHOD AND COMPUTER-READABLE STORAGE MEDIUM

CROSS-REFERENCE TO RELATED APPLICATION

This application is based on and claims priority under 35 USC 119 from Japanese Patent Application No. 2022-005930 filed on Jan. 18, 2022, the disclosure of which is incorporated by reference herein.

TECHNICAL FIELD

The present disclosure relates to a control device, a vehicle, a control method and a computer-readable storage medium.

RELATED ART

Patent Document 1: Japanese Patent Application Laid-Open (JP-A) No. 2008-077220 (Patent Document 1) discloses an object-oriented vehicle control system that can keep effects on applications and data to a minimum even in a case in which there is a change in the design of a storage medium. This technique discloses the point that a method that converts data into persistent corresponding data, which is a stored form of the data, is embedded into a persistent corresponding data converting processing class.

Patent Document 2: JP-A No. 2016-134057 (Patent Document 2) is a technique relating to the accurate computation of the heap region size that is actually used at the time of executing an application.

SUMMARY

Patent Document 1 that is prior art assumes that the relationships of correspondence of media/data classifications that are referred to within the persistent managing class are corrected in a case in which there is a change in the design of the storage medium classification. In Patent Document 2 that is prior art, at the time when an object is generated in the heap region in correspondence with execution of an application, object specifying information that specifies that object is registered in the load object management information in correspondence with identification information of that application.

However, in the prior art, for example, when a change in class structure or the like arises due to a design change, compatibility at the time of backup restoration cannot be ensured, and therefore, it is assumed that the backup data cannot be utilized.

An object of the present disclosure is to provide a control device and a control program that can improve the compatibility with respect to a change in the design of the class structure relating to a storage region.

A control device of a first aspect is control device that operates due to a processor executing an object-oriented program, wherein the processor: backs up, to a storing section, respective first combinations in which respective elements of a first object, in which class structure relating to an application program is defined, are set in correspondence with first IDs, and backs up, to the storing section, respective second combinations in which respective elements of a second object, in which class structure relating to a storage region used by an application program is defined, are set in correspondence with second IDs; and in a case in which generation of an object is necessary when the program is started, for the first object, reads-out the respective first combinations from the storing section and generates the first object, and, for the second object, reads-out the respective second combinations from the storing section and generates the second object.

In the control device of the first aspect, combinations, in which respective elements of the first and second objects are set in correspondence with the respective IDs thereof, are backed-up, and are read-out in a case in which generation of an object is needed, and an object is generated. Due thereto, the compatibility with respect to a change in the design of the class structure relating to the storage region can be improved.

In a control device of a second aspect, in the control device of the first aspect, the processor can set elements, which are needed to generate the first object, and the first IDs in correspondence with one another as the respective first combinations, and can set elements, which are needed to generate the second object, and the second IDs in correspondence with one another as the respective second combinations.

In accordance with the control device of the second aspect, only backing-up of the necessary element is carried out, and the compatibility with respect to a change in the design of the class structure relating to the storage region can be improved.

In a control device of a third aspect, in the control device of the first or second aspect, the first object can be a user object relating to a user that expresses an application in the object orientation, and the second object can be a directory object relating to a directory of a storage region that the user utilizes in the object orientation.

In accordance with the control device of the third aspect, the compatibility of user objects and directory objects in object orientation can be improved.

In a control device of a fourth aspect, in the control device of any one of the first through third aspects, the processor can carry out backing-up in a case in which there is an update of the first object or the second object.

In accordance with the control device of the fourth aspect, backing-up of a necessary element in a case in which an object is updated can be carried out.

In a control device of a fifth aspect, in the control device of any one of the first through fourth aspects, the processor can utilize updating of a class structure of the first object or the second object as a standard for judging whether or not generation of an object is necessary, and can judge that generation is necessary in a case in which the class structure has been updated, and can judge that generation is unnecessary in a case in which the class structure has not been updated.

In accordance with the control device of the fifth aspect, a necessary element in a case in which the class structure is updated can be read-out, and an object can be generated.

A vehicle of a sixth aspect is a vehicle in which the control device of any one of the above-described first through fifth aspects is installed.

A control method of a seventh aspect is a control method that is carried out due to a processor executing an object-oriented program, and in which a computer executes processings in which the processor: backs up, to a storing section, respective first combinations in which respective elements of a first object, in which class structure relating to an application program is defined, are set in correspondence with first IDs, and backs up, to the storing section, respective second combinations in which respective elements of a second object, in which class structure relating to a storage region used by an application program is defined, are set in correspondence with second IDs; and in a case in which generation of an object is necessary when the program is started, for the first object, reads-out the respective first combinations from the storing section and generates the first object, and, for the second object, reads-out the respective second combinations from the storing section and generates the second object.

A control program of an eighth aspect is an object-oriented control program executable by a processor to cause a computer to execute processings in which the processor: backs up, to a storing section, respective first combinations in which respective elements of a first object, in which class structure relating to an application program is defined, are set in correspondence with first IDs, and backs up, to the storing section, respective second combinations in which respective elements of a second object, in which class structure relating to a storage region used by an application program is defined, are set in correspondence with second IDs; and in a case in which generation of an object is necessary when the control program is started, for the first object, reads-out the respective first combinations from the storing section and generates the first object, and, for the second object, reads-out the respective second combinations from the storing section and generates the second object.

In accordance with the technique of the present disclosure, compatibility with respect to a change in the design of the class structure relating to a storage region can be improved.

BRIEF DESCRIPTION OF THE DRAWINGS

FIG. 4 is a drawing illustrating an example of combinations that are backed-up in a key value storage;

DETAILED DESCRIPTION

Figure 1:
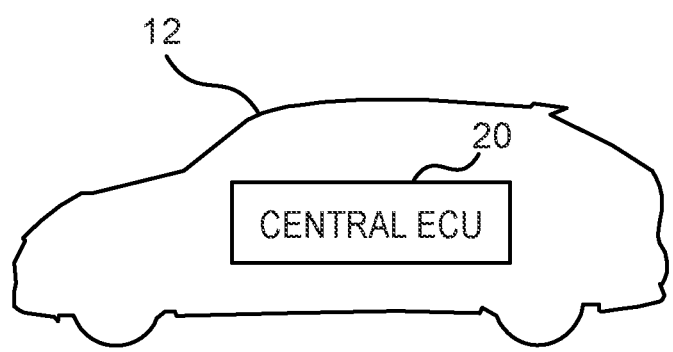
FIG. 1 is a drawing illustrating the schematic structure of a vehicle relating to an embodiment.

An overview of an embodiment of the present invention is described. In the present embodiment, a storage coordinator that is written in an object-oriented program is utilized.

The storage coordinator is a coordinator that is provided at an ECU in order to mediate between an application program that the user executes and the storage region. The storage coordinator provides functions such as improving usage efficiency by varying the regions of the storage that are used, preventing a specific application from occupying storage, managing access levels, and the like. The premise thereof is that, at the storage coordinator, because internal data is initialized at the time when the power of the vehicle is turned off, data must be backed-up to a key value storage that is an external storage. The key value storage is a storage in which keys and values in object orientation are stored in correspondence with one another.

The data that must be backed up at the storage coordinator is user information and directory information. User information is information such as which user (application) is currently using the storage region, and the like. Directory information is information such as how much storage the user is using, and the like. In object orientation, an object is handled as an entity in which data and functions are grouped together. Objects include user objects relating to user information, and directory objects relating to directory information. The class structure that relates to the application program is defined in the user object. The class structure that relates to the application program is the structure of the elements that are handled as the user class. The class structure that relates to the storage region that the application program uses is defined in the directory object. The class structure that relates to the storage region is the structure of the elements that are handled as the directory class. A user object is an example of the "first object" of the technique of the present disclosure. A directory object is an example of the "second object" of the technique of the present disclosure.

In backup methods in object orientation that have older designs, the user object and the directory object are backed-up as is as binary data in the key value storage, from the standpoint of improving the efficiency of reading-out the backup data. However, such older designs cannot address situations at times when the software is updated and the structure of the user class or the directory class changes. The reason for this is that, if a change arises in a part of the class structure due to updating such as changing, adding, deleting or the like of an element of the object, even if the binary data is read-in as is, the binary data cannot be used. Accordingly, within the storage coordinator, a new user object after the update is required. However, if a situation arises in which the user object that is read-out from the backup data is in accordance with the old conditions, the backup data cannot be used due to nonconformity of the data.

Thus, the present embodiment is designed such that, without storing the object as is in a key value storage, the information that is needed to in order to generate the object is linked with an ID, and these are stored one-by-one as combinations of the object, and the object is generated by itself on the basis of information that is read-out at the time of reading-out the backup data, and is restored. For example, for a user object, an element such as "user name" or the like is stored in correspondence with the "user id". Due thereto, even cases in which the class structure of the object changes due to updating of the software can be addressed.

As illustrated in FIG. 1, in an embodiment of the present invention, a central ECU 20 is installed in a vehicle 12. The central ECU 20 is an example of the "control device" of the present disclosure.

(Vehicle)

Figure 2:
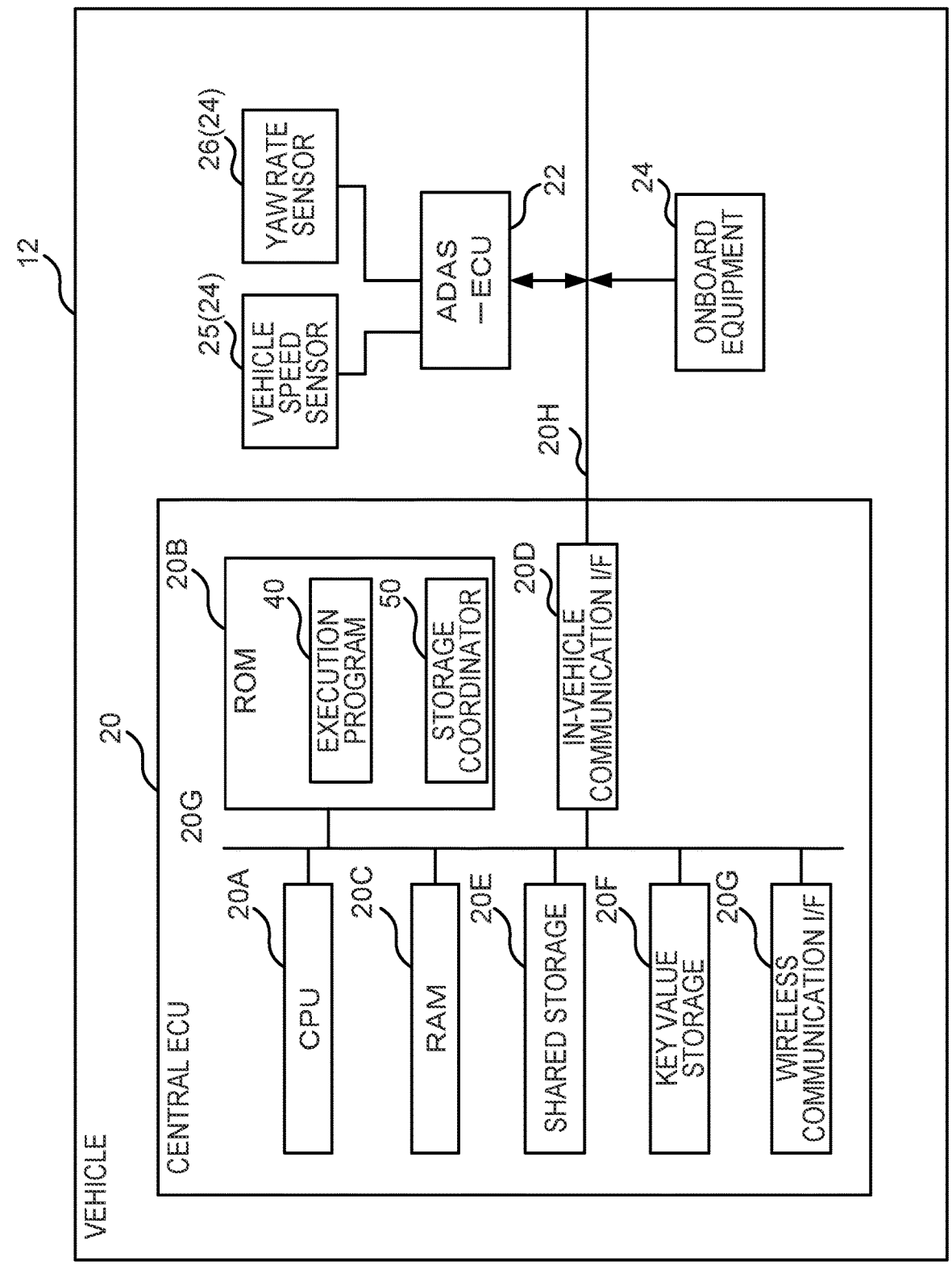
FIG. 2 is a block drawing illustrating hardware structures of the vehicle of the embodiment.

As illustrated in FIG. 2, the vehicle 12 relating to the present embodiment is structured to include the central ECU (Electronic Control Unit) 20, an ADAS-ECU 22, and onboard equipment 24.

The central ECU 20 is structured to include a CPU (Central Processing Unit) 20A, a ROM (Read Only Memory) 20B, a RAM (Random Access Memory) 20C, an in-vehicle communication I/F (interface) 20D and a wireless communication I/F 20G. The CPU 20A, the ROM 20B, the RAM 20C, the in-vehicle communication I/F 20D, a shared storage 20E, a key value storage 20F and the wireless communication I/F 20G are connected to as to be able to communicate with one another via an internal bus 20H. Note that the CPU 20A may be structured by plural CPUs. The key value storage 20F is an example of the "storing section" of the technique of the present disclosure.

The CPU 20A is a central computing processing unit, and executes various programs and controls the respective sections. Namely, the CPU 20A reads-out programs from the ROM 20B, and executes the programs by using the RAM 20C as a workspace.

The ROM 20B stores various programs and various data. An execution program 40, which utilizes functions of various application programs of the vehicle 12, is stored in the ROM 20B of the present embodiment. Further, a storage coordinator 50 is stored in the ROM 20B. The storage coordinator 50 is a program that functions as a coordinator that mediates usage of the shared storage 20E by the execution program 40, and is written as an object-oriented program. The storage coordinator 50 is an example of the "control program" of the technique of the present disclosure.

The RAM 20C temporarily stores programs and data as a workspace. Internal data of the storage coordinator 50 is held in the RAM 20C.

The in-vehicle communication I/F 20D is an interface for connection with the ADAS-ECU 22 and the onboard equipment 24. This interface uses communication standards in accordance with CAN protocol. The in-vehicle communication I/F 20D is connected to the external bus 20H.

The shared storage 20E is a storage region in which data of the various applications, which are executed by the execution program 40 and the like, is stored by mediation of the storage coordinator 50. Note that the shared storage 20E is set such that access thereto is permitted only via the storage coordinator 50.

The key value storage 20F is a storage region in which are stored IDs (keys) and elements (values) of user objects and directory objects that are handled at the storage coordinator 50.

The wireless communication I/F 20G is a wireless communication module for communicating with external servers. This wireless communication module uses communication standards such as, for example, 5G, LTE, Wi-Fi® or the like. The wireless communication I/F 20G is connected to network N.

The central ECU 20 has the function of being responsible for steering control, braking control, engine control, control of information systems such as the car navigation system and the audio system and the like, and the like, although illustration thereof is omitted for convenience of explanation.

The ADAS-ECU 22 carries out integrated control of the advanced driver assist system. A vehicle speed sensor 25 and a yaw rate sensor 26 that structure the onboard equipment 24 are connected to the ADAS-ECU 22.

Note that the onboard equipment 24 also includes, in addition to these and as equipment that are needed to realize the functions of the central ECU 20, a steering angle sensor, a braking actuator, a throttle actuator, and other sensors.

Figure 3:
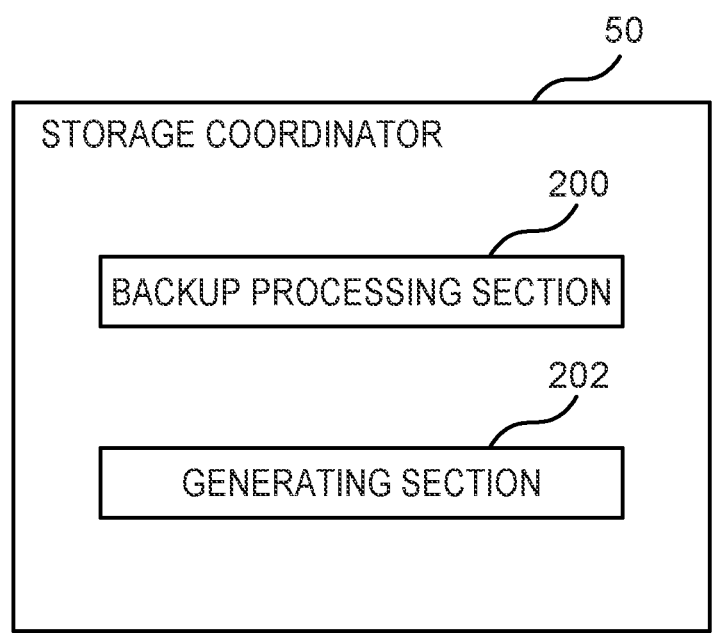
FIG. 3 is a block drawing illustrating functional structures of a central ECU of the embodiment.

As illustrated in FIG. 3, at the central ECU 20 of the present embodiment, due to the CPU 20A executing the storage coordinator 50, the central ECU 20 functions as a backup processing section 200 and a generating section 202. Note that concrete description of the function of the storage coordinator 50 mediating between the applications and the shared storage 20E is omitted here.

The backup processing section 200 backs up, in the key value storage 20F, information combinations in which elements, which are needed in order to generate an object, and IDs are set in correspondence with one another. The correspondence between the elements and the IDs is backed-up respectively for the user objects and the directory objects. The backup processing section 200 backs up, in the key value storage 20F and as combinations of user information, user IDs and the elements that are needed to generate an object among the elements of the user object. The backup processing section 200 backs up, in the key value storage 20F and as combinations of directory information, directory IDs and the elements that are needed to generate an object among the elements of the directory object. The combinations of user information are examples of the "first combinations" of the technique of the present disclosure, and the combinations of directory information are examples of the "second combinations" of the technique of the present disclosure.

FIG. 4 is a drawing illustrating an example of combinations that are backed-up in the key value storage 20F. Combinations 200A of user information and combinations 200B of directory information that are backed-up in the key value storage 20F are illustrated in FIG. 4. Combinations in which "user id" (the user ID) and elements of the user object correspond to one another are respectively backed-up as the combinations 200A of user information. FIG. 4 illustrates that combinations of IDs and elements that are "user name", "shared_directory_id" and "private_directory_id" are respectively stored from the top of the record as elements of the combinations 200A of the user information. Combinations in which "directory_id" (the directory ID) and elements of the directory object correspond to one another are respectively backed-up as the combinations 200B of directory information. FIG. 4 illustrates that combinations of IDs and elements, which are "directory total size" and "directory used size" that relate to information about the capacity per directory, are respectively stored from the top of the record as elements of the combinations 200B of the directory information. Note that "shared_directory_id" and "private_directory_id" express the IDs of the shared directory and the private directory in accordance with the access authorities of the respective directories. For example, a shared directory is a directory that permits sharing of the directory with other users (applications), and a private directory is a directory that is occupied by the user of the user ID corresponding to the private directory.

In a case in which an object must be generated at the time of starting the storage coordinator 50, the generating section 202 reads-out information of the combination needed for generating from the key value storage 20F, and generates the object. In a case of generating a user object, the generating section 202 reads-out the combination 200A of the user information needed for that user object from the key value storage 20F, and generates the user object. In a case of generating a directory object, the generating section 202 reads-out the combinations 200B of the directory information needed for that directory object from the key value storage 20F, and generates the directory object.

(Flow of Control)

Figure 5:
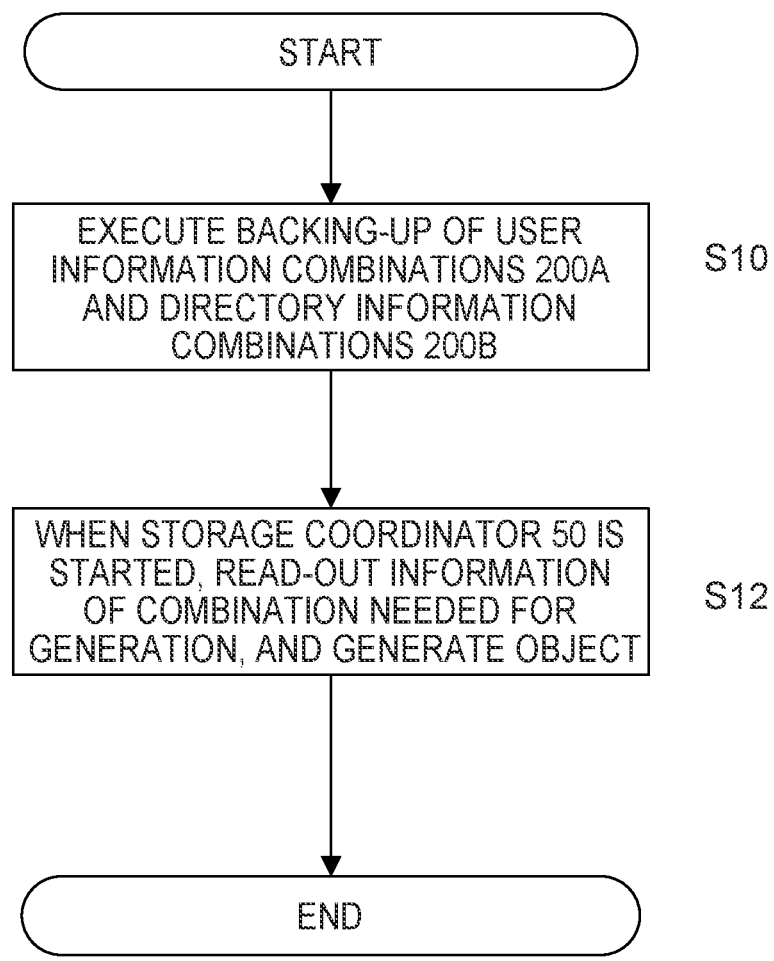
FIG. 5 is a flowchart of overall control processing that includes backup processing and object generating processing.
Figure 6:
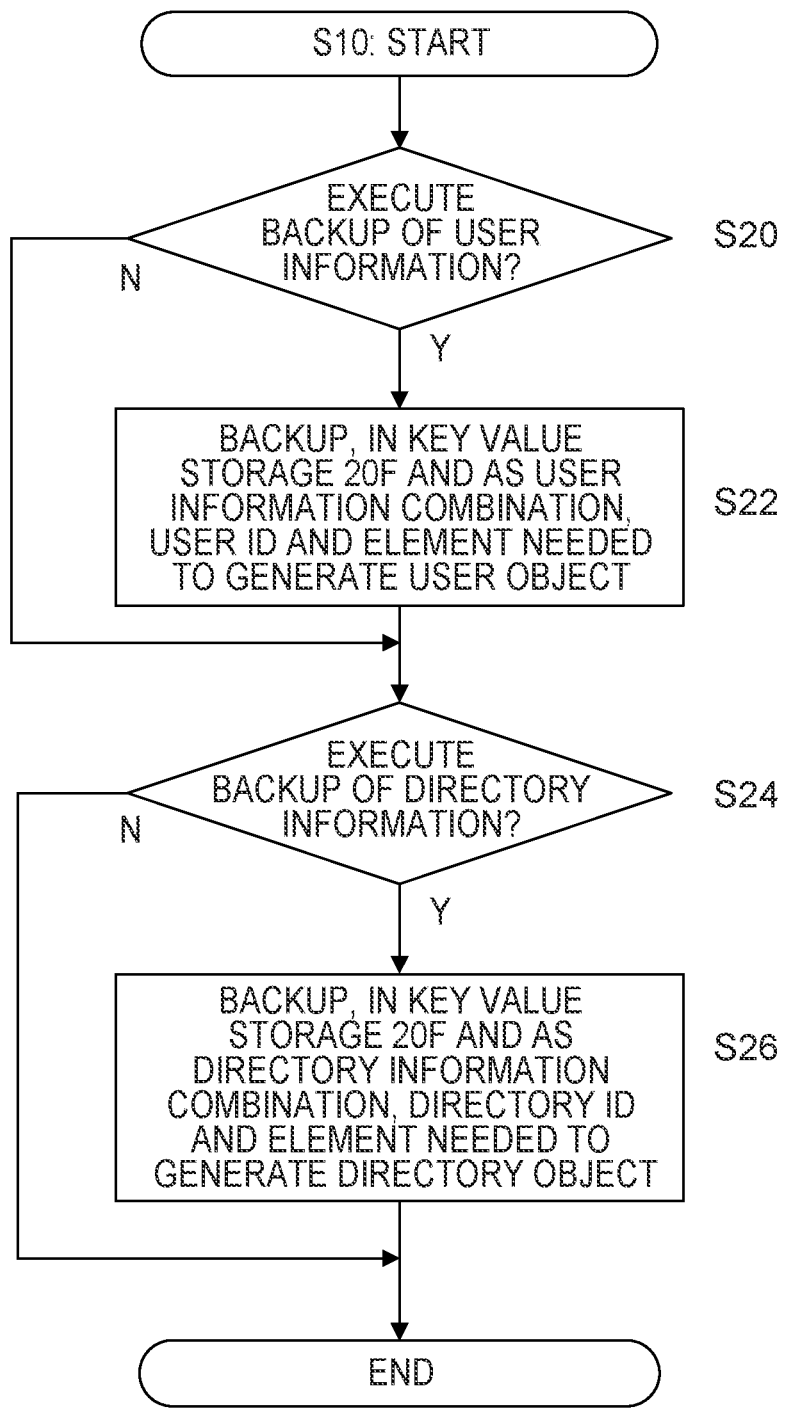
FIG. 6 is a flowchart illustrating the flow of the backup processing.
Figure 7:
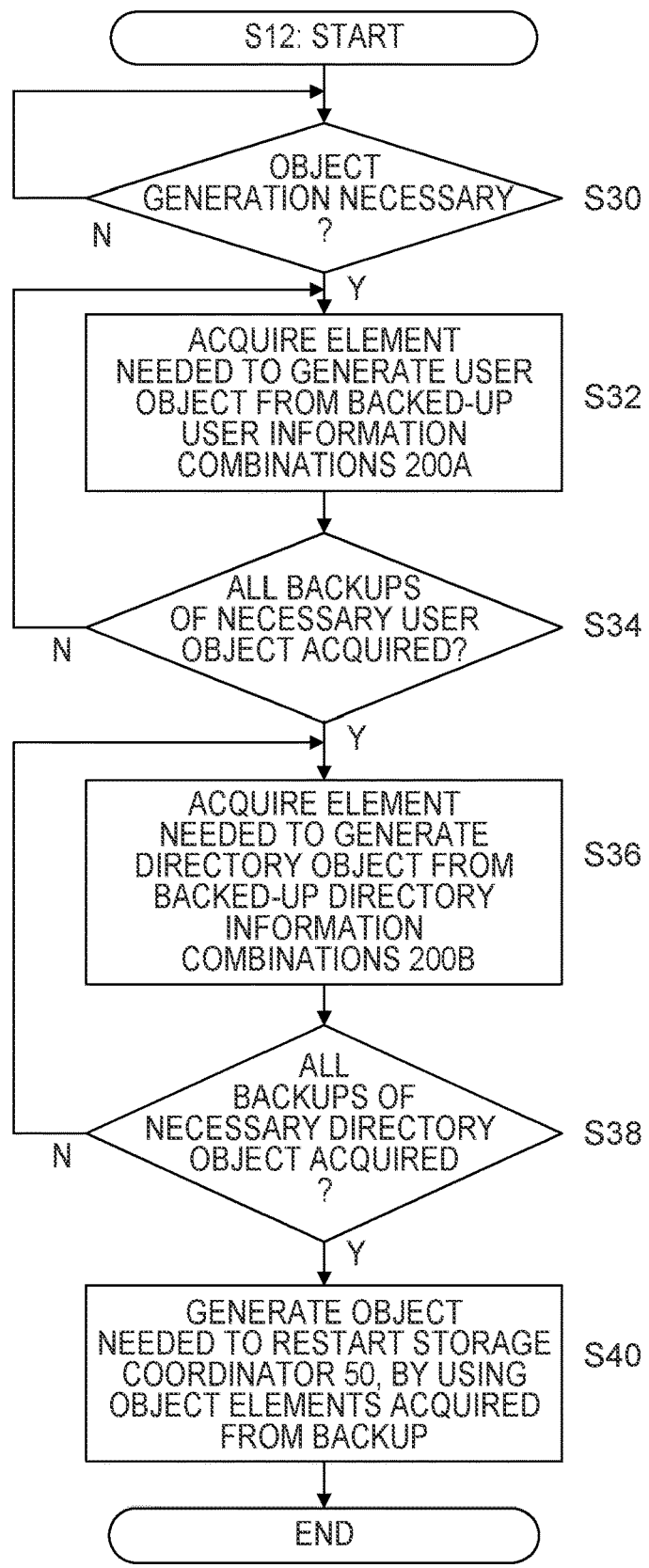
FIG. 7 is a flowchart illustrating the flow of the object generating processing.

The flows of the backup processing and object generating processing, which are methods of control executed by the central ECU 20 of the present embodiment, are described by using the flowcharts of FIG. 5 through FIG. 7. FIG. 5 is a flowchart of the overall control processing that includes the backup processing and the object generating processing.

In step S10, the CPU 20A executes backing-up of the combinations 200A of user information and the combinations 200B of directory information. In step S12, in a case in which an object must be generated at the time of starting the storage coordinator 50, the CPU 20A reads-out information of the combination needed for generating from the key value storage 20F, and generates the object.

Details of the backup processing of step S10 are described next by using the flowchart of FIG. 6. Note that the backup processing is executed periodically regardless of the flow illustrated in FIG. 5.

In step S20, a CPU 20A judges whether or not to execute backup of user information. If it is judged that backing-up of user information is to be executed, the CPU 20A moves on to step S22. If it is judged that backing-up of user information is not to be executed, the CPU 20A moves on to step S24. Note that the standard for judging whether backing-up of user information is to be executed may be a case in which an update, such as a change, addition, deletion or the like, with respect to the user has occurred, or a case in which a fixed time has elapsed.

In step S22, the CPU 20A backs up the user ID and the element, which is needed to generate the user object among the elements of the user object, to the key value storage 20F as a combination of user information. An element of the user object that is needed in order to generate the user object may be defined in advance at the storage coordinator 50, or may be acquired by an update from an external server or the like. Further, in a case in which there is excess capacity at the key value storage 20F that is the backup destination, or the like, all of the elements included in the user object may be backed-up. The same holds for the elements of the directory object as well.

In step S24, the CPU 20A judges whether or not to execute backup of directory information. If it is judged that backing-up of directory information is to be executed, the CPU 20A moves on to step S26. If it is judged that backing-up of directory information is not to be executed, the CPU 20A ends the processing. Note that the standard for judging whether backing-up of directory information is to be executed may be a case in which an update, such as a change, addition, deletion or the like, with respect to the directory has occurred, or a case in which a fixed time has elapsed.

In step S26, the CPU 20A backs up the directory ID and the element, which is needed to generate the directory object among the elements of the directory object, to the key value storage 20F as a combination of directory information. An element of the directory object that is needed in order to generate the directory object may be defined in advance at the storage coordinator 50, or may be acquired by an update from an external server or the like.

Details of the object generating processing of step S12 are described next by using the flowchart of FIG. 7. Note that the object generating processing is executed at the time of starting the storage coordinator 50, regardless of the flow illustrated in FIG. 5.

In step S30, the CPU 20A judges whether or not object generation is needed at the time when the storage coordinator 50 is started. If it is judged that generation is needed, the CPU 20A moves on to step S32. If it is judged that generation is not needed, the CPU 20A periodically repeats step S30. Note that a case in which generating of an object is necessary is a case in which the storage coordinator 50 is read-in at the time when the storage coordinator 50 is started, or is a case in which access to the shared storage 20E becomes necessary after starting. The time at which the storage coordinator 50 is started is, for example, a case in which the power of the vehicle 12 is turned off, and the power is turned on again, and the storage coordinator 50 is started. Further, the standard for judging whether or not generation of an object is necessary may be the fact that the class structure of a user object or a directory object has been updated. In this case, it is judged that generation is necessary in the case of an object having been updated, and it is judged that generation is not necessary in a case in which an object has not been updated. The determination as to the absence/presence of updating of the class structure may be carried out by the class structures being recorded in advance in the key value storage 20F, and class structure updating information being received from an external server, and the updating information being compared with the recorded class structures.

In step S32, the CPU 20A acquires an element that is needed in order to generate the user object, from the combinations 200A of user information that have been backed-up in the key value storage 20F.

In step S34, the CPU 20A judges whether or not all of the back-ups of the necessary user object have been acquired. If it is judged that all have been acquired, the CPU 20A moves on to step S36. If it is judged that not all have been acquired, the CPU 20A returns to step S32, and repeats the steps until all have been acquired. Note that an element that is needed in order to generate a user object is an element of the user object of the user ID that was held in the storage coordinator 50 before the internal data of the storage coordinator 50 was initialized. Further, an element that is needed in order to generate a directory object that will be described later is, similarly, an element of the directory object of the directory ID that was held in the storage coordinator 50. Step S34 is skipped in a case in which one of user object generation and directory object generation is not needed.

In step S36, the CPU 20A acquires an element that is needed in order to generate the directory object, from the combinations 200B of directory information that have been backed-up in the key value storage 20F.

In step S38, the CPU 20A judges whether or not all of the back-ups of the necessary directory object have been acquired. If it is judged that all have been acquired, the CPU 20A moves on to step S40. If it is judged that not all have been acquired, the CPU 20A returns to step S36, and repeats the step until all have been acquired.

In step S40, the object that is needed in order to restart the storage coordinator 50 is generated by using the elements of the object that have been acquired from the backup.

(Overview)

The central ECU 20 that serves as the control device of the present embodiment backs up, in the key value storage 20F, information of combinations in which elements needed for object generation and IDs are set in correspondence with one another. In a case in which generation of an object becomes necessary at the time of starting the storage coordinator 50, the central ECU 20 reads-out the information of the combination needed for generation from the key value storage 20F, and generates the object. In this way, user information and directory information in object orientation are stored in a backed-up format of combinations in which IDs and elements, which are different than binary data, are set in correspondence with one another, and the information is read-out as needed at the time of restarting the storage coordinator 50. Due thereto, the compatibility with respect to changes in the design of the class structure relating to the storage region can be improved.

Note that any of various types of processors other than a CPU may execute the various processings that are executed due to the CPU 20A reading software (a program) in the above-described embodiment. Examples of processors in this case include PLDs (Programmable Logic Devices) whose circuit structure can be changed after production such as FPGAs (Field-Programmable Gate Arrays) and the like, and dedicated electrical circuits that are processors having circuit structures that are designed for the sole purpose of executing specific processings such as ASICs (Application Specific Integrated Circuits) and the like, and the like. Further, the above-described respective processings may be executed by one of these various types of processors, or may be executed by a combination of two or more of the same type or different types of processors (e.g., plural FPGAs, or a combination of a CPU and an FPGA, or the like). Further, the hardware structures of these various types of processors are, more specifically, electrical circuits that combine circuit elements such as semiconductor elements and the like.

Further, the above-described embodiment describes a form in which the respective programs are stored in advance (installed) on a non-transitory, computer-readable recording medium. However, the present disclosure is not limited to this. The respective programs may be provided in a form of being recorded on a non-transitory recording medium such as a CD-ROM (Compact Disc Read Only Memory), a DVD-ROM (Digital Versatile Disc Read Only Memory), a USB (Universal Serial Bus) memory, or the like. Further, the programs may in a form of being downloaded from an external device over a network.

The flows of the processings described in the above embodiment are examples, and unnecessary steps may be deleted therefrom, new steps may be added thereto, or the order of processings may be changed, within a scope that does not depart from the gist of the present invention.

What is claimed is:

1. A control device that operates due to a processor executing an object-oriented program, wherein the processor:
   backs up, to a storing section, respective first combinations in which respective elements of a first object, in which a class structure relating to an application program is defined, are set in correspondence with first IDs, and backs up, to the storing section, respective second combinations in which respective elements of a second object, in which a class structure relating to a storage region used by an application program is defined, are set in correspondence with second IDs; and
   when the program is started and generation of an object is necessary, for the first object, reads out the respective first combinations from the storing section and generates the first object, and, for the second object, reads out the respective second combinations from the storing section and generates the second object.

2. The control device of claim 1, wherein the processor:
   sets elements, which are needed in order to generate the first object, and the first IDs, in correspondence with one another as the respective first combinations, and
   sets elements, which are needed in order to generate the second object, and the second IDs, in correspondence with one another as the respective second combinations.

3. The control device of claim 1, wherein:
   the first object is a user object relating to a user that expresses an application in the object orientation, and
   the second object is a directory object relating to a directory of a storage region that the user utilizes in the object orientation.

4. The control device of claim 1, wherein the processor carries out backing-up in a case in which there is an update of the first object or the second object.

5. The control device of claim 1, wherein the processor utilizes updating of a class structure of the first object or the second object as a standard for judging whether or not generation of an object is necessary, judges that generation is necessary in a case in which the class structure has been updated, and judges that generation is unnecessary in a case in which the class structure has not been updated.

6. A vehicle in which the control device of claim 1 is installed.

7. A control method that is carried out due to a processor executing an object-oriented program, and in which a computer executes processing in which the processor:
   backs up, to a storing section, respective first combinations in which respective elements of a first object, in which a class structure relating to an application program is defined, are set in correspondence with first IDs, and backs up, to the storing section, respective second combinations in which respective elements of a second object, in which a class structure relating to a storage region used by an application program is defined, are set in correspondence with second IDs; and
   when the program is started and generation of an object is necessary, for the first object, reads out the respective first combinations from the storing section and generates the first object, and, for the second object, reads out the respective second combinations from the storing section and generates the second object.

8. A non-transitory computer-readable storage medium storing an object-oriented control program executable by a processor to cause a computer to execute processing in which the processor:
   backs up, to a storing section, respective first combinations in which respective elements of a first object, in which a class structure relating to an application program is defined, are set in correspondence with first IDs, and backs up, to the storing section, respective second combinations in which respective elements of a second object, in which a class structure relating to a storage region used by an application program is defined, are set in correspondence with second IDs; and
   when the program is started and generation of an object is necessary, for the first object, reads out the respective first combinations from the storing section and generates the first object, and, for the second object, reads out the respective second combinations from the storing section and generates the second object.

* * * * *